H. E. West.
Pressing Hats.
Nº 270
31274
Patented Jan. 29, 1861.
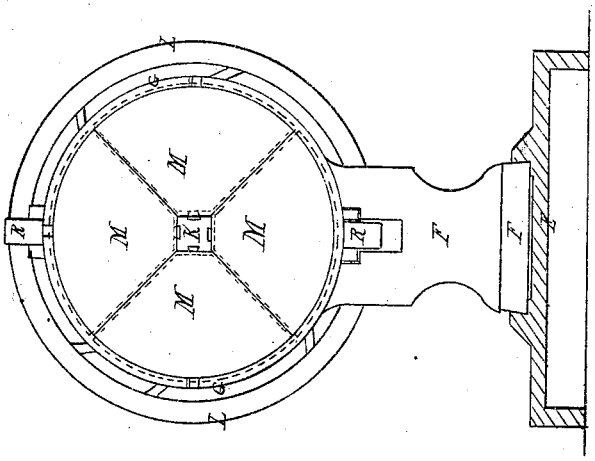
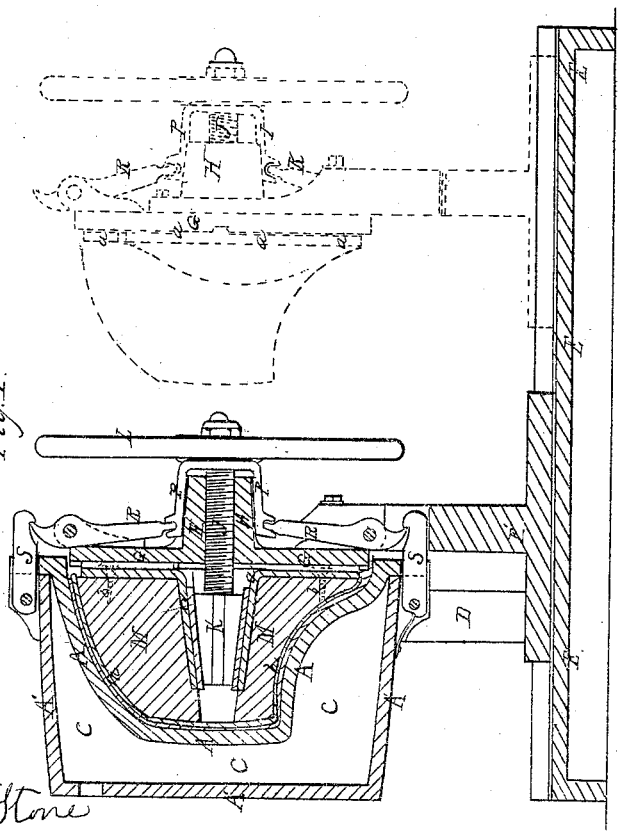
Witnesses:
William M. Stone
Samuel M. Holman
Inventor:
Hiram E. West

UNITED STATES PATENT OFFICE.

HIRAM E. WEST, OF ATTLEBORO, MASSACHUSETTS.

MACHINE FOR PRESSING BONNETS.

Specification of Letters Patent No. 31,274, dated January 29, 1861.

*To all whom it may concern:*

Be it known that I, HIRAM E. WEST, of Attleboro, in the county of Bristol and State of Massachusetts, have invented certain new and useful Improvements in Machinery for Pressing Straw Bonnets, &c.; and I do hereby declare that the following is a full, clear, and exact description thereof, reference being had to the accompanying drawings, forming a part of this specification, in which—

Figure 1 represents a longitudinal vertical section, taken through the machine while shaping a bonnet. The block and sliding head is also shown in this figure in red lines, drawn out of the bonnet mold with the parts in different positions. Fig. 2 is a vertical elevation showing the bonnet block, when expanded, as it would appear in the section of Fig. 1.

Similar letters of reference indicate corresponding parts in both figures.

My invention relates to the pressing and shaping of straw bonnets, hats, etc., and it consists in certain novel machinery hereinafter described for effecting the object with great facility and rapidity, the devices consisting of a metal expansion block for pressing the bonnet when in the mold, which mold must correspond to the shape of the block when expanded, an elastic covering being upon said block and a novel device for locking the block in the mold, at the same time pressing the block gradually into the mold with a sufficient force to give the bonnet the desired shape without injury to the texture of the same, as hereinafter described.

To enable others skilled in the art to make and use my invention I will proceed to describe its construction and the manner of using it.

By reference to the drawings, A represents a mold in which the bonnet or hat is to be formed or shaped and pressed, made of cast metal and provided with a case or covering, A′, leaving a space, C, between the back surface of the mold, and the said case for the admission of steam or other suitable heating medium for keeping the mold hot. This mold and its case which are made separate and bolted together, are mounted upon a standard, D, which is fixed permanently to a stand, E. The mold must, of course, be changed for every style and size of bonnet to be pressed but the metal case, A′, may be made so as to serve for every variety of bonnets by removing one mold and introducing another in its stead.

F is a standard fixed to a plate, F′, with its sides beveled for the purpose of working true in a guide way on the top of stand, E, and to keep said standards down firmly upon the stand during the operation of pressing. To this standard is bolted a circular head, G, the center of which corresponds with that of the casing, B. This circular head has a central enlargement, H, projecting from its back, which is tapped and a female screw thread cut for receiving screw, J, which operates a wedge or tapering block, K, so as to expand the bonnet block, M, when securely locked in the mold. This block is made up of four or more sections which when brought together assume the shape of the bonnet to be pressed on them, but the block thus formed is somewhat smaller than its mold, A. These sections which form the block are secured to angular plates, *a a a a*, by screws, *b*, which plates are cut so as to correspond with the inner surfaces of each section, and consequently those portions of the plates covering the enlarged ends of the sections correspond with the circular head, G, while the portions of the plates at right angles to these quadrants are tapering, and extend out nearly to the crown of the block. These plates, *a a a a*, are each secured to the circular head, G, by a dovetail tenon working in a corresponding groove in the head, as shown by Fig. 2. The tapering projections of these plates are also furnished with dove-tail tenons which fit into corresponding grooves in the tapering block, K, these secure the plates, *a a a a*, and consequently the blocks to the sliding block. This block, K, is now operated so as to have a horizontal motion back and forth in the bonnet block, M, by the screw, J, which works loosely in the end of the block, K, the screw projects a suitable distance beyond the end of the hub, H, and receives a fly-wheel, L, which is rotated with the hand in operating the machine. This gives a description of the mold in which the bonnets are shaped and pressed and the peculiar construction of the bonnet block whereby the parts of the same are extended so as to adapt itself uniformly to the sides of the mold when placed therein, and the block, K, driven firmly up; but it is necessary in order to complete the operation of shaping the bonnet that the block should be securely locked in the mold at the same time, and in order to press the crown of the bonnet that the block should be forced farther into the mold while the sections of the block are expanding; for this purpose I have adopted the following device.

P is a yoke which is placed on the screw, J, between the hub of the circular head, G, and fly-wheel, L, with its arms working in slots in the hub of head, G, for guiding and steadying it in its movements, the ends of these arms have notches, as clearly shown by Fig. 1, into which are placed the ends of the longer arms of two hooked levers, R R, which are respectively pivoted to the top and bottom of the head, G. Now by rotating the wheel, L, the yoke, P, is forced forward and with it the longer arms of its levers, R R, and by unscrewing or reversing the motion of the fly-wheel, the levers will be drawn out. On the top and bottom of the case, A', are jointed and hooked arms, S S, which, when the block is in the position represented by Fig. 1, in black lines, hook over the ends of levers, R R, and lock the block securely in the mold, and hold it there during the operation of pressing and shaping the bonnet, so that the block may be driven hard into the crown of the mold, at the same time the sections are expanding laterally.

The operation of pressing bonnets, etc. with this machine may be briefly described, as follows: To press a straw bonnet after it is bleached, it is properly moistened and placed over the block, M, when the stand is in the position indicated by the red lines, Fig. 1, but previously to placing it on the block a covering, h, is placed over the block of any suitable elastic material, e. g., india-rubber, or cloth, will answer the purpose, it being necessary to use such elastic covering on solid blocks whether they be made of one piece or in sections, as the yielding of this covering will prevent the bruising and breaking to which the straw would be subjected by the uncovered block. The bonnet is then placed over this elastic covering. The stand is then brought up to the mold and the block placed in the same (which is properly heated for the purpose) and locked there by the arms, S S, which hook over the ends of levers, R R, as before shown. The fly-wheel, L, is then rotated swiftly and the wedged block, K, driven forward in the bonnet block, which gradually causes the sections to recede from the center and to press with a uniform, but powerful force against the sides of the mold, while this expansion of the block is taking place it is being driven farther into the mold by the action of the yoke upon the levers, R R, so that every part of the bonnet will be effectually pressed and shaped; when the operation is complete the motion of the wheel, L, is reversed, which draws back the arms of the levers, R R, unlocks the parts and, at the same time, draws the wedged block, K, back and contracts the block, M; the parts are then pushed back from the mold and the bonnet removed in a dry, pressed and finished condition. Another bonnet may then immediately be placed on the block and the operation repeated.

In pressing and shaping bonnets it is important to obtain as even and uniform surface as possible, without injuring the braid or ripping the sewing, when one portion of the braid overlaps another. This uniformity of pressure is obtained by my machine with great ease and the operation is effected with rapidity, while a bonnet made of inferior braid, or an old bonnet, where the braid is more or less defective, can be pressed and re-shaped with far less risk in my machine than by the common methods.

What I claim as my invention, and desire to secure by Letters Patent, is:—

1. The mold, A, to form the bonnet to be pressed, in combination with an expansion block, when the same is made in sections and each section distended simultaneously by means of a wedged block, K, and screw, J, or the equivalents thereof, essentially as described.

2. The yoke, P, levers, R R, and hooked arms, S S, in combination with the hand wheel, L, when the same are all arranged so as to operate simultaneously with the expansion block, M, for the purposes and in the manner substantially as set forth.

3. In combination with a block constructed substantially as herein set forth I claim the elastic covering as and for the purpose described.

HIRAM E. WEST.

Witnesses:
SAMUEL M. HOLMAN,
WILLIAM M. STONE.